United States Patent [19]

Kattelmann

[11] 4,378,897

[45] Apr. 5, 1983

[54] VOLUMETRIC FEEDING APPARATUS FOR MATERIALS IN BULK FORM

[75] Inventor: Harry R. Kattelmann, Oakland, Calif.

[73] Assignee: Fabricated Metals, Inc., San Leandro, Calif.

[21] Appl. No.: 161,510

[22] Filed: Jun. 20, 1980

[51] Int. Cl.$^3$ .............................................. B67D 5/08
[52] U.S. Cl. ...................................... 222/56; 222/63; 222/64; 222/199; 222/450; 198/616; 198/771
[58] Field of Search ...................... 222/56, 55, 63, 64, 222/195, 199, 200, 450, 409; 198/534, 550, 616, 771

[56] References Cited

U.S. PATENT DOCUMENTS 2,276,382  3/1942  Francis .................................. 222/56
2,408,221  9/1946  Michel .................................. 222/56
4,169,543  10/1979  Hall ..................................... 222/56

FOREIGN PATENT DOCUMENTS 421601  1/1975  U.S.S.R. .............................. 222/199

OTHER PUBLICATIONS

Publication by H. A. Stoess, Jr. entitled Pneumatic Conveying, 1970, pp. 17, 18, 86 and 87.

*Primary Examiner*—Charles A. Marmor

*Attorney, Agent, or Firm*—Jack M. Wiseman; Francis W. Anderson

[57] ABSTRACT

Apparatus for volumetrically feeding dry flowable bulk material. The apparatus comprises a hopper that receives dry flowable bulk material from a storage tank of dry flowable bulk material through a rotary valve located at the top of the hopper. At the bottom of the hopper is a sliding discharge gate for the discharge of dry flowable bulk material from the hopper. Mounted on the hopper in vertically spaced relation is a high level sensor and a lower level sensor. When the height of the dry flowable bulk material in the hopper is above a predetermined height, the high level sensor is activated for the closing of the rotary valve and the opening of the discharge gate. When the height of the dry flowable bulk material in the hopper is below a predetermined height, the low level sensor closes the discharge gate and opens the rotary valve. Thus, the bulk material level in the hopper is maintained within prescribed limits to control the pressure head of the bulk material for improved feed accuracy. A vibratory feeder disposed below the discharge gate includes a holding cavity to store bulk material for the continuous feeding of bulk material from the apparatus during the period of time the discharge gate is closed. Thus, the apparatus converts an intermittent batch-type process into a continuous feed apparatus.

9 Claims, 3 Drawing Figures

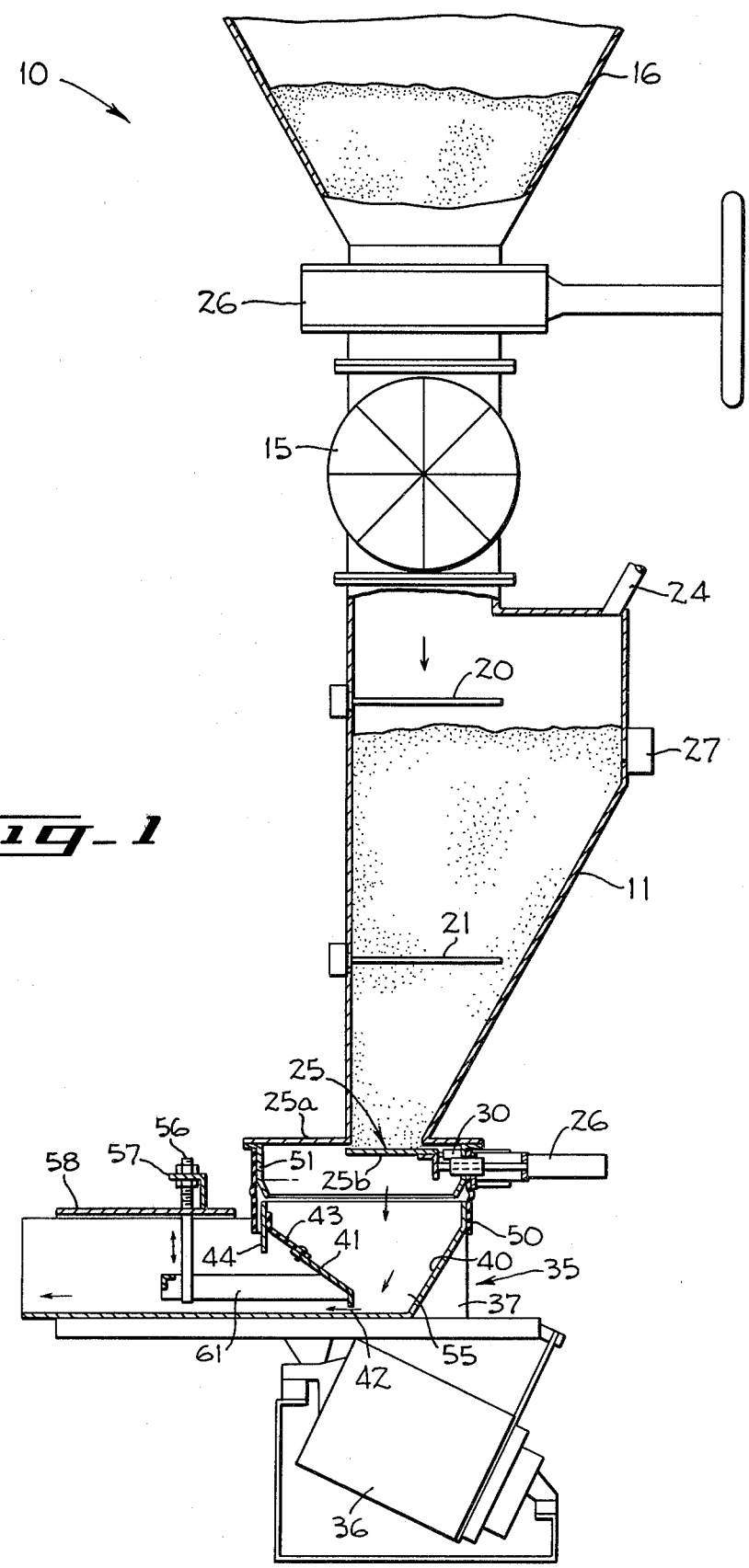
Fig_1

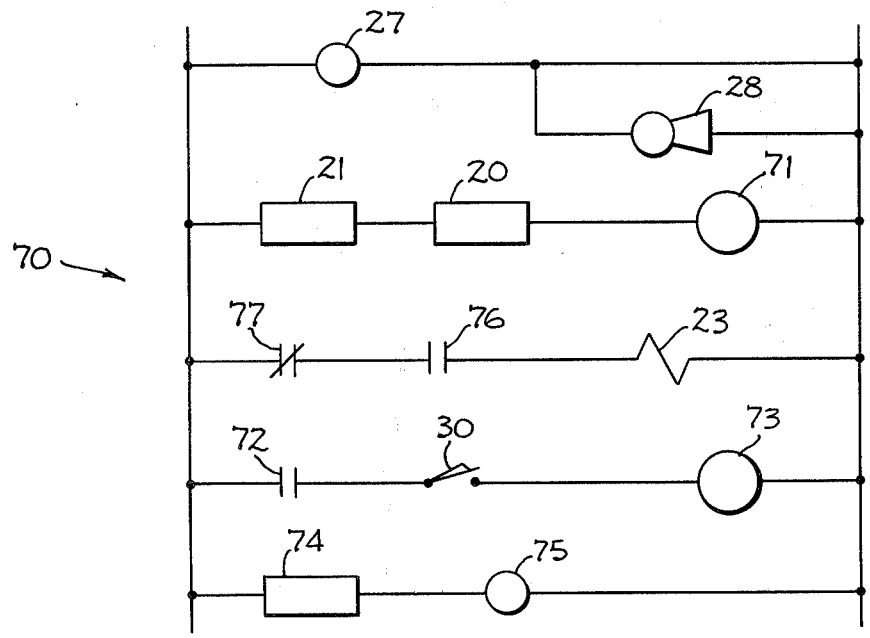
Fig_2
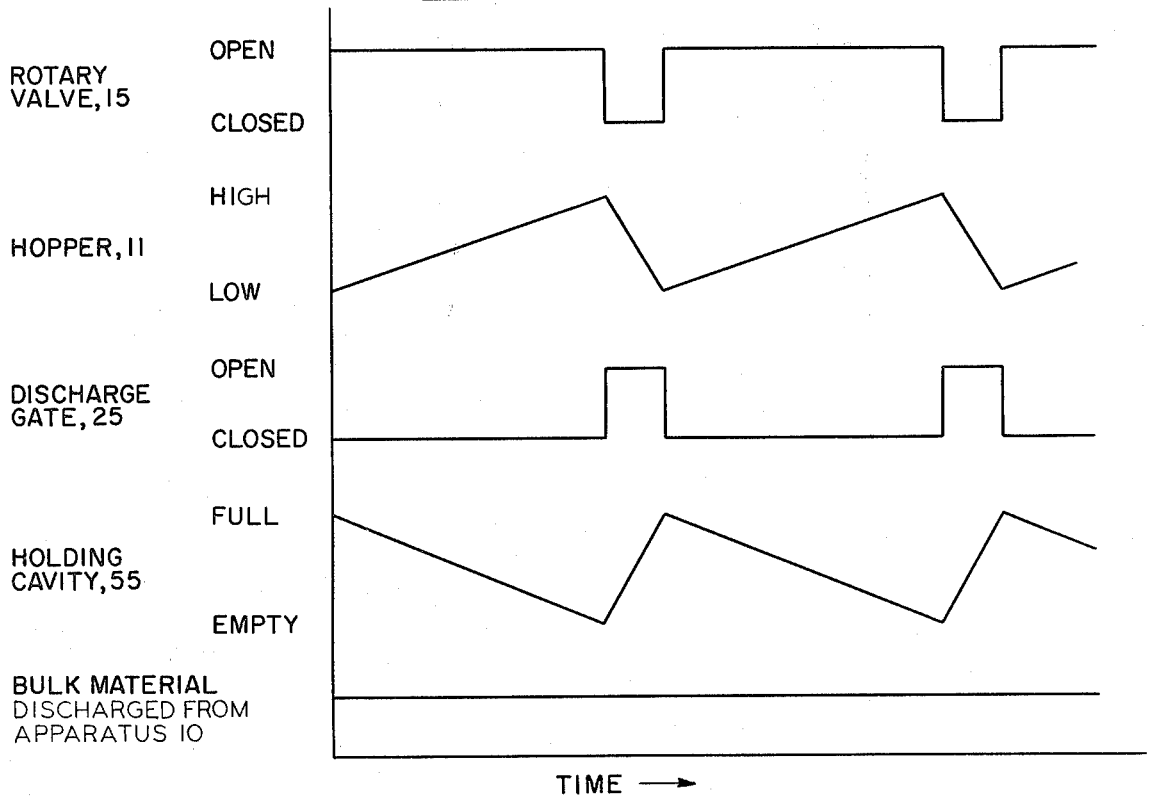
Fig_3

VOLUMETRIC FEEDING APPARATUS FOR MATERIALS IN BULK FORM

BACKGROUND OF THE INVENTION

The present invention relates in general to apparatus for the volumetric feeding of materials, and more particularly to apparatus for the volumetric feeding of dry flowable bulk material.

Heretofore, apparatus for the volumetric feeding of bulk material employed screw augers, vibratory feeders and belt conveyors. Such apparatus by themselves were not suitable to prevent uncontrolled flow of dry bulk material. Screw augers and belt conveyors did not lend themselves to wide variations in the rate of feeding dry bulk material and did not lend themselves to desirable uniformity in the rate of feeding the dry bulk material. Suitable feed accuracy for dry bulk material has been obtained through a weigh belt feeder. Such an apparatus, however, was costly and had limited feed rate variations.

SUMMARY OF THE INVENTION

Apparatus for feeding bulk material comprising a hopper. Above the hopper are inlet means for controlling the flow of bulk material from a source of bulk material into the hopper. At the bottom of the hopper is a gate to control the flow of bulk material discharged from the hopper. Mounted on the hopper in vertically spaced relation is a high level material sensor and a low level material sensor. The operation of the discharge gate and the inlet means are controlled by the activation of the level sensors, whereby the discharge gate is closed and the inlet means are opened for filling the hopper with bulk material when the low level sensor is activated and the discharge gate is opened for discharging bulk material from the hopper and the inlet means are closed to interrupt the flow of bulk material into the hopper when the upper level sensor is activated. Thus, the quantity of bulk material in the hopper is maintained between prescribed limits for controlling the pressure head of the bulk material in the hopper for improved feed accuracy.

An object of the present invention is to provide apparatus for volumetric feeding of bulk material in which the rate of feeding the bulk material is controlled over a relatively wide range with improved accuracy in the controlled rate of feeding.

A feature of the present invention is that dry flowable bulk material, such as powdered activated carbon, is discharged from a hopper with wide variations in the rate of discharge and yet the controlled rate of discharge of the flowable dry bulk material is relatively uniform.

The present invention has achieved a gravimetric feed rate of powdered activated carbon from 10 to 600 pounds per hour with an accuracy of better than 10% of the selected rate.

DESCRIPTION OF THE DRAWINGS

FIG. 1 is a diagrammatic elevation view of the apparatus embodying the present invention with portions thereof broken away.

FIG. 2 is a schematic circuit diagram of the control circuit employed in the apparatus shown in FIG. 1.

FIG. 3 is a graphic illustration of timing sequences employed in the apparatus shown in FIG. 1.

DESCRIPTION OF THE PREFERRED EMBODIMENT

Illustrated in FIG. 1 is the apparatus 10 of the present invention for volumetrically metering and feeding dry flowable bulk materials. The apparatus 10 is particularly suitable in feeding dry flowable bulk materials that are difficult to control. Bulk materials which flow in an uncontrolled manner or cease to flow under certain conditions present such difficulties. The apparatus 10 achieves a discharge of dry flowable bulk materials over a wide range of feeding rates with good uniformity. For example, the apparatus 10 of the present invention discharges powdered activated carbon at a gravimetric feed rate varying from 10 to 600 pounds per hour with an accuracy of better than 10% of the selected rate.

The apparatus 10 embodying the present invention comprises a suitable hopper 11. In the exemplary embodiment, the hopper 11 has a capacity of approximately seven cubic feet. Above the hopper 11 is mounted material inlet means 15 for controlling the flow of dry flowable bulk material from a source of bulk material 16 into the hopper 11. In the preferred embodiment, the material inlet means 15 are a conventional and well-known electrically controlled rotary valve. The source of bulk material 16 is a suitable storage tank, silo, bin or the like. In the exemplary embodiment, the storage tank 16 has a capacity of 1,000–2,000 cubic feet in volume.

Mounted on the hopper 11 are a high level sensor 20 and a low level sensor 21 which are spaced apart vertically. The level sensors 20 and 21 are of the type manufactured by Endress-Hauser, Inc. of Greenwood, Indiana, under the mark VIBRATOL FTM 1630. The level sensors 20 and 21 detect the maximum and minimum levels of bulk material. The level sensors 20 and 21 energize electrical devices, such as relays to actuate the contacts thereof. Detection is carried out by tuning forks. When the tuning fork is free of material, the tines vibrate. Mechanical energy is transmitted and is converted to electrical energy through piezo crystal systems.

The level sensors 20 and 21 are located at the upper and lower height limits prescribed for the hopper 11. When the level of bulk material in the hopper 11 falls below the predetermined lower limit, the level sensor 21 is activated. When the level of the bulk material in the hopper reaches the predetermined upper limit, the level sensor 20 is activated.

At the bottom of the hopper 11 is located a slide gate 25. The slide gate 25 comprises juxtaposed horizontal members 25a and 25b. The number 25a is fixedly positioned and the member 25b is slidable relative thereto for the opening and closing of the discharge gate 25. Connected to the movable member 25a for imparting sliding movement thereto is a suitable pneumatic cylinder 26. The operation of the pneumatic cylinder 26 is controlled through a solenoid operated pneumatic valve 23 in a well-known manner.

When the low level sensor 21 is activated, the discharge gate 25 is closed to interrupt the discharge of bulk material from the hopper and the rotary valve 15 is opened to deposit bulk material from the storage tank 16 into the hopper 11. When the level of the bulk material in the hopper 11 reaches the upper predetermined level, the upper level sensor 20 is activated to close the rotary valve 15 for interrupting the flow of bulk material from the storage tank 16 into the hopper 11 and to open the discharge gate 25 for the discharge of bulk material from the hopper 11.

From the foregoing, it is to be observed that the operation of discharge gate 25 and the operation of the rotary valve 15 are electrically controlled by the activation of the level sensors 20 and 21 to maintain the quantity of bulk material 11 in the hopper 11 within prescribed limits. In this manner, the pressure head of the dry flowable bulk material in the hopper 11 is maintained within a predetermined magnitude, and, hence, lends the apparatus 10 to a more accurate metering or discharge of bulk material at a controlled feed rate.

In addition, the alternate opening and closing between the discharge gate 25 and the rotary valve 15 inhibits a pumping-like action from the rotary valve 15 tending to urge bulk material out of the hopper 11 in an uncontrolled flow.

Below the discharge gate 25 is located a vibratory feeder 35. The feed rate of the apparatus 10 is controlled by the vibratory feeder 35. In the exemplary embodiment, the feed rate of the apparatus 10 is varied by the vibratory feeder 35 from zero to 100% of its capacity. The vibrating tray 37, the vibrator drive mechanism, and the associated variable transformer are conventional and well-known devices of the type manufactured by Eriez Manufacturing Co. of Erie, Pa., Model No. 50A.

The feed rate of the vibratory feeder 35 is regulated, in part, by a variable transformer, not shown, in a remote location that controls the vibrating action of the vibratory feeder 35 by controlling a vibrator drive mechanism or controller 36 in a well-known manner. Further regulation of the feed rate of the vibratory feeder 35 is provided by adjusting the depth of a discharge gap 42 of the vibratory feeder 35. In this manner, a wide range of feeder rates is provided by the apparatus 10.

The vibratory feeder 35 comprises a vibrating cross plate or back plate 40, which is located at the rear of the vibratory feeder 35. The back plate 40 reduces direct material head load and also prevents bulk material from becoming compacted at the back of a vibrating feeder tray 37. Opposite the back plate 40, the vibrating feeder 35 includes a vertically adjustable vibrating baffle 41. The vibrating baffle 41 distributes the bulk material uniformly across the vibrating feeder tray 37. In the exemplary embodiment, the tray 37 is approximately 25 inches long, 15 inches wide and 8 inches deep. The vibrating baffle 41 also controls the depth of the gap 42. The depth of the gap 42 controls, in part, the feed rate of vibratory feeder 35. It also contributes to the efficiency of vibratory feeder 35 by adjusting the height therefor to obtain optimum vibratory activity for the particular mass of the bulk material.

The depth of the gap 42 is determined by the height of space between the base of the tray 37 and the lowermost wall of the vibrating baffle 41. The vibrating baffle 41 is supported by a rigid depending wall 44 of the vibratory feeder 35 through a yieldable member 43 at the upper extremity thereof. Through this arrangement, the vibrating baffle 41 is vertically adjustable for varying the height of the gap 42 between the base of the vibrating feed tray and the lowermost wall of the vibrating baffle.

For adjusting the height of the vibrating baffle 41, a threaded adjusting member 56 is received by a bracket 57 that is fixed to a cover plate 58 of the vibrating tray 37. The threaded member 56 is vertically adjustable in the bracket 57. An arm 61 is carried by the threaded adjusting member 56 for movement therewith and is fixed to the vibrating baffle 41 to impart movement thereto. Thus, the raising and lowering of the threaded adjusting member 56 moves the vibrating baffle 41 for varying the height thereof to regulate the height of the gap 42.

A holding cavity 55 is formed by the discharge gate 25, the back plate 40, the baffle 41 and the sides and the bottom of the vibrating tray 37. The volumetric capacity of the holding cavity 55 is sufficient to store an adequate quantity of bulk material for the continuous feeding of bulk material from the apparatus 10 during the periods of time that the discharge gate 25 is closed and the rotary valve 15 is opened for the filling of the hopper 11. Thus, the intermittent batch-type process of filling the hopper 11 is converted to a continuous feed process by the storing of the bulk material within the holding cavity 55. The bulk material advancing through the gap 42 is advanced in the vibrating tray 37 onto the product flow path.

The vibratory feeder 35 is spaced from the discharge gate 25 to prevent the vibratory feeder 35 from transmitting a vibrating motion to the discharge gate 25 and the components of the apparatus thereabove. Sealing the space between the discharge gate 25 and the vibratory feeder 35 is a flexible sleeve 50. A metal skirt or a rigid load collar 51 is fixed to the discharge gate 25 in depending relation thereto for reducing the load bearing on the flexible sleeve 50 from the discharge of bulk material. In this manner, excessive wear on the flexible sleeve 50 is obviated.

Connected to the hopper 11 through a conduit 24 is a source of low negative pressure (not shown) in the order of 0.15 inches W.C. to 0.5 inches W.C. The conduit 24 is a vacuum line for the apparatus 10 and is located at the upper section of the hopper 11. The connecting of the vacuum source to the hopper 11 serves to cause air to flow through the bulk material in the hopper 11 for the aerating of the bulk material. This action induces uniform consistency of the bulk material in the hopper 11 and thereby reduces bridging and packing in the bulk material. The vacuum line connection to the hopper also serves to reverse the direction of air flow through the hopper 11. This action inhibits the bulk material from flowing out of the hopper 11 in a uncontrolled manner. Additionally, the reversal of the direction of air flow through the hopper 11 induced by the vacuum line connection inhibits outward leakage of bulk material at flanges, sleeves and other fittings. This action aids in the maintenance of cleanliness and the appearance of the apparatus 10.

Between the storage tank 16 and the rotary valve 15 is disposed a conventional and well-known manually operated safety gate valve 26. Any suitable manually operated slide gate valve may be employed. The gate valve 26 is normally opened and is closed for maintenance purposes. It prevents the deposit of bulk material from the storage tank 16 to the hopper 11 during the maintenance of the apparatus 10.

Mounted on the hopper 11 below the vacuum line conduit 24 is a loss-of-vacuum sensor 27, which is of the type manufactured by Dwyer Instruments, Inc., Catalog No. 1996-20. In the event of a loss of vacuum for any reason, an alarm 28 is operated. A pressure differential sensed by the sensor 27 actuates an electrical switch to operate the alarm 28.

A discharge gate-position sensor 30 is mounted on the hopper 11 adjacent the discharge gate 25. The discharge gate-position sensor 30 is in the form of a microswitch manufactured by Micro-Switch, No. EX-N15. The discharge gate-position sensor 30 prevents the rotary valve 15 from opening to deposit bulk material into the hopper 11 as long as the discharge gate 25 is not completely closed.

Illustrated in FIG. 2 is a control circuit 70 for the apparatus 10. A suitable source of electrical power, not shown, is applied across the conductor lines. Initially, the rotary valve 15 is opened for the deposit of bulk material from the storage tank 16 into the hopper 11 and the discharge gate 25 is closed to interrupt the flow of bulk material from the hopper 11 to the vibratory feeder 35. The low level sensor 21 functions as normally opened contacts and the upper level sensor 20 functions as normally closed contacts. A motor starter 71, which includes a coil, is energized over a path including the sensor 21, the sensor 20 and the motor starter 71. The energization of the motor starter 71 closes the normally opened contacts 72 thereof. In series with the contacts 72 is the gate switch 30. Since the discharge gate 25 is closed, the gate switch 30 is closed. A rotary valve motor 73 is energized to open the rotary valve 15. The rotary valve motor 73 is energized over a path including the closed contacts 72, the closed gate switch 30 and the motor 73.

Bulk material continues to flow into the hopper 11 until the height thereof reaches the upper level sensor 20 to activate the same. The activation of the upper level sensor 20 opens the energizing path of the motor starter 71 to deenergize the same. The contacts 72 of the motor starter 70 are returned to the normally opened state. This results in the deenergization of the motor 73 for the rotary valve 15. The deenergization of the motor 73 causes the rotary valve 15 to close.

The discharge gate 25 is operated through the pneumatic cylinder 26. The operation of the pneumatic cylinder 26 is controlled by the solenoid controlled pneumatic valve 23. The energization of the solenoid controlled pneumatic valve 23 opens the discharge gate 25 and the deenergization of the solenoid controlled pneumatic valve 23 closes the discharge gate 25.

The vibratory feeder 35 operates by the closing of a start circuit 74. More specifically, the closing of the start circuit 74 energizes a relay 75. The energization of the relay 75 closes contacts to operate the vibratory feeder 35. Normally opened contacts 76 of the relay 75 are closed in response to the energization of the relay 75. When the rotary valve 15 is closed, the motor starter 71 is deenergized. Normally closed contacts 77 of the motor starter 71 are closed when the motor starter 71 is deenergized. The solenoid controlled pneumatic valve 23 is energized to open the discharge gate over a path including the closed contacts 77 and the closed contacts 76.

Bulk material is discharged from the hopper 11 to the vibratory feeder 35 through the discharge gate 25. The bulk material continues to flow from the hopper 11 to the vibratory feeder 35 until the height of the bulk material falls below the predetermined low level to activate the low level sensor 21. At that time, the low level sensor 21 completes a path to energize the motor starter 71 in a manner previously described. The contacts 77 of the motor starter 77 open to deenergize the solenoid controlled pneumatic valve 23. Thereupon, the discharge gate 25 closes. The energization of the motor starter 71 closes contacts 72 to energize the rotary valve motor 73. The rotary valve 73 is opened. The above cycle is repeated until the power is turned-off. In the event the discharge gate 25 fails to close completely, the switch 30 is open to prevent the energization of the rotary valve motor 73.

Illustrated in FIG. 3 is a graphic illustration of the timing sequence between the rotary valve 15 and the discharge gate 25 is employed in the apparatus 10. It is to be observed that the rotary valve 15 is opened while the discharge gate 25 is closed and, conversely, the rotary valve 15 is closed while the discharge gate 25 is opened. It is to be observed that the holding cavity 55 of the vibratory feeder 35 is full of bulk material, while the bulk material in the hopper 11 is at the low level. Conversely, the holding cavity 55 of the vibratory feeder 55 has a reduced quantity of bulk material, while the bulk material in the hopper 11 has reached its upper level. In addition, the bulk material in the hopper 11 increases in height as the holding cavity 55 reduces its contents of bulk material. Conversely, the bulk material in the hopper 11 decreases in height as the quantity of bulk material in the holding cavity 55 increases. Thus, there is a continuous flow of bulk material discharged from the apparatus 10.

I claim:

1. Apparatus for volumetric feeding of bulk material comprising:
   (a) a hopper;
   (b) inlet means disposed above said hopper for controlling the deposit of bulk material into said hopper;
   (c) discharge means disposed below said hopper for controlling the discharge of bulk material from said hopper;
   (d) an upper level sensor mounted on said hopper and activated in response to the bulk material in said hopper reaching a predetermined height;
   (e) a lower level sensor mounted on said hopper and activated in response to the bulk material in said hopper falling below a predetermined height;
   (f) control means responsive to the activation of said upper level sensor for closing said inlet means to interrupt the deposit of bulk material into said hopper and for opening said discharge means for the discharge of bulk material from said hopper, said control means being responsive to the activation of said lower level sensor for closing said discharge means to interrupt the discharge of bulk material from said hopper and for opening said inlet means for the deposit of bulk material into said hopper;
   (g) a vibrator feeder disposed below said discharge means in communication with said discharge means for controlling the rate at which bulk material is discharged from said apparatus, said vibrator feeder comprising a cavity to receive the bulk material from said hopper, said cavity being of a volumetric capacity to hold a sufficient quantity of bulk material to continue the flow of bulk material from said apparatus during the intermittent periods in which said discharge means are closed; and
   (h) a vacuum conduit connected to said hopper for providing a vacuum for said hopper to aerate the bulk material in said hopper and to reverse air flow in said hopper for inhibiting an uncontrolled flow of bulk material from said hopper when said discharge means are opened.

2. Apparatus as claimed in claim 1 wherein said inlet means is a rotary valve and said discharge means is a sliding gate.

3. Apparatus as claimed in claim 1 and comprising a flexible sleeve seal interconnecting said discharge means and said vibratory feeder, and a rigid collar mounted on said discharge means in depending relation for reducing the load on said flexible seal resulting from the discharge of bulk material.

4. Apparatus as claimed in claim 2 and comprising storage means disposed above said rotary valve for storing bulk material to be deposited in said hopper when said rotary valve is open.

5. Apparatus for volumetric feeding of bulk material comprising:
(a) a hopper;
(b) inlet means disposed above said hopper for controlling the deposit of bulk material into said hopper;
(c) discharge means disposed below said hopper for controlling the discharge of bulk material from said hopper;
(d) an upper level sensor mounted on said hopper and activated in response to the bulk material in said hopper reaching a predetermined height;
(e) a lower level sensor mounted on said hopper and activated in response to the bulk material in said hopper falling below a predetermined height;
(f) control means responsive to the activation of said upper level sensor for closing said inlet means to interrupt the deposit of bulk material into said hopper and for opening said discharge means for the discharge of bulk material from said hopper, said control means being responsive to the activation of said lower level sensor for closing said discharge means to interrupt the discharge of bulk material from said hopper and for opening said inlet means for the deposit of bulk material into said hopper; and
(g) a gate-position sensor responsive to the position of said discharge means to inhibit the opening of said inlet means until said discharge means are closed completely.

6. Apparatus for volumetric feeding of bulk material comprising:
(a) a hopper;
(b) inlet means disposed above said hopper for controlling the deposit of bulk material into said hopper;
(c) discharge means disposed below said hopper for controlling the discharge of bulk material from said hopper;
(d) an upper level sensor mounted on said hopper and activated in response to the bulk material in said hopper reaching a predetermined height;
(e) a lower level sensor mounted on said hopper and activated in response to the bulk material in said hopper falling below a predetermined height;
(f) control means responsive to the activation of said upper level sensor for closing said inlet means to interrupt the deposit of bulk material into said hopper and for opening said discharge means for the discharge of bulk material from said hopper, said control means being responsive to the activation of said lower level sensor for closing said discharge means to interrupt the discharge of bulk material from said hopper and for opening said inlet means for the deposit of bulk material into said hopper; and
(g) a vibrator feeder disposed below said discharge means in communication with said discharge means for controlling the rate at which bulk material is discharged from said apparatus, said vibrator feeder comprising a cavity to receive the bulk material from said hopper, said cavity being of a volumetric capacity to hold a sufficient quantity of bulk material to continue the flow of bulk material from said apparatus during the intermediate periods in which said discharge means are closed, said vibrator feeder comprising a vibrator feeder tray in which bulk material is deposited, a vertically adjustable, vibrating baffle for controlling a gap between a lower wall of said vibrating baffle and a base of said tray to control the feed rate of bulk material dischaged from said apparatus, and a flexible member for yieldably supporting said vibrating baffle in depending relation to enable said vibrating baffle to be vertically adjustable.

7. Apparatus as claimed in claim 6 and comprising means on said feeder tray connected to said vibrating baffle for adjusting the height of said vibrating baffle to regulate the height of the gap between the lower wall of said vibrating baffle and the base of said feeder tray.

8. A vibrating feeder for bulk material comprising:
(a) a vibrating feeder tray;
(b) means for imparting a vibrating motion to said vibrating feeder tray;
(c) a vibrating back plate mounted on said vibrating feeder tray;
(d) a vibrating baffle supported by said vibrating feeder tray,
(e) said vibrating feeder tray, said vibrating back plate and said vibrating baffle forming a holding cavity in which bulk material is contained for continuous feeding from said vibrating feeder, a lower wall of said vibrating baffle and a base of said vibrating feeder tray are spaced apart to form a gap through which bulk material flows from said holding cavity; and
(f) a flexible member supported by said vibrating feeder tray and connected to the upper portion of said vibrating baffle for supporting said vibrating baffle to enable said vibrating baffle to be vertically adjustable.

9. A vibratory feeder as claimed in claim 8 and comprising means on said vibrating feeder tray connected to said vibrating baffle for adjusting the height of said vibrating baffle to regulate the height of said gap between the lower wall of said vibrating baffle and the base of said vibrating feeder tray.

* * * * *